(12) United States Patent
Bringuier et al.

(10) Patent No.: US 8,989,542 B2
(45) Date of Patent: Mar. 24, 2015

(54) OPTICAL FIBER ASSEMBLIES HAVING A POWDER OR POWDER BLEND AT LEAST PARTIALLY MECHANICALLY ATTACHED

(71) Applicant: Corning Optical Communications LLC, Hickory, NC (US)

(72) Inventors: Anne Germaine Bringuier, Taylorsville, NC (US); Rodney Maurice Burns, Conover, NC (US); John Arthur Rowe, Winston-Salem, NC (US); Catharina Lemckert Tedder, Catawba, NC (US); Brian Smith Witz, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/264,152

(22) Filed: Apr. 29, 2014

(65) Prior Publication Data
US 2015/0055921 A1    Feb. 26, 2015

Related U.S. Application Data

(63) Continuation of application No. 13/923,956, filed on Jun. 21, 2013, now Pat. No. 8,750,661, which is a continuation of application No. 13/444,370, filed on Apr. 11, 2012, now Pat. No. 8,542,966, which is a
(Continued)

(51) Int. Cl.
G02B 6/44        (2006.01)
(52) U.S. Cl.
CPC ........... *G02B 6/4494* (2013.01); *G02B 6/4404* (2013.01); *G02B 6/4433* (2013.01)
USPC ........................................ 385/109

(58) Field of Classification Search
USPC .................................. 385/109–113
See application file for complete search history.

(56) References Cited

U.S. PATENT DOCUMENTS

| | | | |
|---|---|---|---|
| 3,538,235 A | 11/1970 | Arendt et al. | 174/23 |
| 4,002,819 A | 1/1977 | Woytiuk | 174/23 C |
| 4,004,077 A | 1/1977 | Woytiuk | 174/23 C |
| 4,419,157 A | 12/1983 | Ferrentino | 156/56 |

(Continued)

FOREIGN PATENT DOCUMENTS

| | | | | |
|---|---|---|---|---|
| DE | 4134370 C1 | 1/1993 | | H01B 7/28 |
| DE | 4219607 C2 | 9/1995 | | G02B 6/44 |

(Continued)

OTHER PUBLICATIONS

Carol Everett Oliver, "Picking on Icky Pick," *Cabling Business Magazine*, Dec. 2006, 3 pages.

(Continued)

*Primary Examiner* — Eric Wong

(57) ABSTRACT

A fiber optic cable includes one or more optical fibers, a jacket, strength members, and water-swellable powder. The jacket is formed from a polymer and has a cavity defined therein. The one or more optical fibers extend through the cavity. Further, the jacket is non-round in cross-section and the strength members are encapsulated in the jacket on opposite sides of the cavity. The water-swellable powder is at least partially mechanically attached to an inner surface of the cavity, where the mechanical attachment of the water-swellable powder allows a portion of particles of the water-swellable powder to protrude beyond the surface and not be completely embedded therein.

20 Claims, 6 Drawing Sheets

Related U.S. Application Data continuation of application No. 13/030,807, filed on Feb. 18, 2011, now Pat. No. 8,180,190, which is a continuation of application No. 12/221,118, filed on Jul. 31, 2008, now Pat. No. 7,916,989.

(56) References Cited

U.S. PATENT DOCUMENTS

| | | | | |
|---|---|---|---|---|
| 4,441,787 | A | 4/1984 | Lichtenberger | 350/96.23 |
| 4,474,638 | A | 10/1984 | Einsle | 156/494 |
| 4,535,098 | A | 8/1985 | Evani et al. | 521/149 |
| 4,596,443 | A | 6/1986 | Diemeer et al. | 350/96.23 |
| 4,909,592 | A | 3/1990 | Arroyo et al. | 350/96.23 |
| 5,010,209 | A | 4/1991 | Marciano-Agostinelli et al. | 174/23 C |
| 5,037,247 | A | 8/1991 | Kaiser et al. | 406/153 |
| 5,049,593 | A | 9/1991 | Marciano-Agostinelli et al. | 523/173 |
| 5,051,259 | A | 9/1991 | Olsen et al. | 424/443 |
| 5,075,373 | A | 12/1991 | Takemori et al. | 525/57 |
| 5,179,611 | A | 1/1993 | Umeda et al. | 385/110 |
| 5,261,021 | A | 11/1993 | Pasta et al. | 385/100 |
| 5,294,217 | A | 3/1994 | Talacko et al. | 406/91 |
| 5,296,650 | A | 3/1994 | Kobayashi et al. | 174/23 C |
| 5,312,499 | A | 5/1994 | Bolick et al. | 156/48 |
| 5,321,788 | A | 6/1994 | Arroyo et al. | 385/109 |
| 5,335,302 | A | 8/1994 | Polle | 385/100 |
| 5,388,175 | A | 2/1995 | Clarke | 385/100 |
| 5,410,629 | A | 4/1995 | Arroyo | 385/109 |
| 5,419,956 | A | 5/1995 | Roe | 428/283 |
| 5,532,788 | A | 7/1996 | Monroe | 355/77 |
| 5,684,904 | A | 11/1997 | Bringuier et al. | 385/109 |
| 5,689,601 | A | 11/1997 | Hager et al. | 385/100 |
| 5,698,615 | A | 12/1997 | Polle | 523/173 |
| 5,740,295 | A | 4/1998 | Kinard et al. | 385/109 |
| 5,751,880 | A | 5/1998 | Gaillard | 385/109 |
| 6,178,278 | B1 | 1/2001 | Keller et al. | 385/109 |
| 6,253,012 | B1 | 6/2001 | Keller et al. | 385/109 |
| 6,304,701 | B1 | 10/2001 | Bringuier et al. | 385/106 |
| 6,466,720 | B1 | 10/2002 | Fishlock et al. | 385/112 |
| 6,493,491 | B1 | 12/2002 | Shen et al. | 385/113 |
| 6,500,541 | B1 | 12/2002 | Schoeck, Jr. et al. | 428/372 |
| 6,501,888 | B2 | 12/2002 | Gimblet et al. | 385/113 |
| 6,504,979 | B1 | 1/2003 | Norris et al. | 385/109 |
| 6,542,674 | B1 | 4/2003 | Gimblet | 385/113 |
| 6,567,592 | B1 | 5/2003 | Gimblet et al. | 385/113 |
| 6,577,796 | B2 | 6/2003 | Anelli et al. | 385/112 |
| 6,631,229 | B1 | 10/2003 | Norris et al. | 385/109 |
| 6,714,710 | B2 | 3/2004 | Gimblet | 385/113 |
| 6,909,821 | B2 | 6/2005 | Ravasio et al. | 385/24 |
| 6,928,217 | B2 | 8/2005 | Mohler et al. | 385/113 |
| 6,931,184 | B2 | 8/2005 | Tedder et al. | 385/109 |
| 7,009,010 | B2 | 3/2006 | Kanto et al. | 526/77 |
| 7,079,734 | B2 | 7/2006 | Seddon et al. | 385/102 |
| 7,098,284 | B2 | 8/2006 | Torii et al. | 526/317.1 |
| 7,193,006 | B2 | 3/2007 | Ishizaki et al. | 524/500 |
| 7,238,743 | B2 | 7/2007 | Matsumoto et al. | 524/556 |
| 7,277,615 | B2 | 10/2007 | Greenwood et al. | 385/100 |
| 7,285,615 | B2 | 10/2007 | Adachi et al. | 526/319 |
| 7,291,674 | B2 | 11/2007 | Kang et al. | 525/54.1 |
| 7,415,181 | B2 | 8/2008 | Greenwood et al. | 385/100 |
| 7,429,009 | B2 | 9/2008 | Nagasawa et al. | 241/3 |
| 7,471,862 | B2 | 12/2008 | Bringuier et al. | 385/113 |
| 7,539,380 | B1 | 5/2009 | Abernathy et al. | 385/100 |
| 7,630,605 | B2 | 12/2009 | Bringuier et al. | 385/100 |
| 7,693,375 | B2 | 4/2010 | Freeland et al. | 385/100 |
| 7,787,727 | B2 | 8/2010 | Bringuier et al. | 385/113 |
| 2002/0159726 | A1 | 10/2002 | Brown et al. | 385/109 |
| 2003/0180017 | A1 | 9/2003 | Hayano et al. | 385/100 |
| 2003/0206705 | A1 | 11/2003 | McAlpine et al. | 385/110 |
| 2004/0177915 | A1 | 9/2004 | Engel | 156/166 |
| 2006/0198585 | A1 | 9/2006 | Keller et al. | 385/107 |
| 2006/0280413 | A1 | 12/2006 | Paschal et al. | 385/112 |
| 2007/0263965 | A1 | 11/2007 | Cody et al. | 385/100 |
| 2007/0269171 | A1 | 11/2007 | Keller et al. | 385/112 |
| 2008/0031580 | A1 | 2/2008 | Keller et al. | 385/113 |
| 2008/0175541 | A1 | 7/2008 | Lu et al. | 385/62 |
| 2008/0175542 | A1 | 7/2008 | Lu et al. | 385/62 |
| 2008/0175546 | A1 | 7/2008 | Lu et al. | 385/92 |
| 2009/0003780 | A1 | 1/2009 | Bringuier et al. | 385/113 |
| 2009/0129734 | A1 | 5/2009 | Keller et al. | 385/109 |
| 2009/0190890 | A1 | 7/2009 | Freeland et al. | 385/111 |
| 2010/0080521 | A1 | 4/2010 | Bardroff et al. | 385/102 |

FOREIGN PATENT DOCUMENTS

| | | | | |
|---|---|---|---|---|
| EP | 0087757 | B1 | 5/1986 | H01B 13/22 |
| EP | 0784220 | A1 | 7/1997 | G02B 6/44 |
| EP | 0784220 | B1 | 3/2006 | G02B 6/44 |
| JP | 50-147745 | A | 11/1975 | G02B 5/14 |
| JP | 08-304675 | A | 11/1996 | G02B 6/44 |
| JP | 10-148739 | A | 6/1998 | G02B 6/44 |
| JP | 2005-148373 | A | 6/2005 | G02B 6/44 |
| WO | WO 97/08579 | A1 | 3/1997 | G02B 6/44 |
| WO | WO 00/21098 | A1 | 4/2000 | H01B 7/28 |
| WO | WO 2006/105034 | A1 | 10/2006 | G02B 6/38 |
| WO | WO 2008/027202 | A2 | 3/2008 | G02B 6/44 |
| WO | WO 2009/002448 | A1 | 12/2008 | G02B 6/44 |

OTHER PUBLICATIONS

Degussa., Creavis Technologies & Innovation, Cabloc® GR 211 Technical Data Sheet, Apr. 2002, 3 pages.
Rosendahl Austria, Nextrom Technologies, "FOC—Dry Tube Production RL-R/OFC40 Clenching Concept, Clenching Caterpillar NCA 210," printed Apr. 17, 2008, 2 pages.
TIA Document: "FOTP 82-B Fluid Penetration Test for Fluid-Blocked Fiber Optic Cable," TIA-455-82-B (Revision of EIA/TIA-455-82-A), Jun. 2003, 18 pages.
Wire and Cable Technology International, Jan. 2008, 51 pages.
Patent Cooperation Treaty, International Search Report for International Application No. PCT/US2009/004684, Jan. 20, 2010, 3 pages.
Patent Cooperation Treaty, International Search Report for International Application No. PCT/US2009/004059, Oct. 30, 2009, 2 pages.
Optoelectronic Industry and Technology Development Association (Japan), Technical Paper, TP-BW01-2007, "Optical Fiber Distribution system for Detached Houses in FTTH," Jul. 2007, 20 pages.
Fujikura Ltd., Product Specification Sheet, "DCO1 / Drop Cable," 2003, 1 page.
European Search Report, Application No. EP 11157672.4, Dec. 23, 2011, 10 pages.

US 8,989,542 B2

OPTICAL FIBER ASSEMBLIES HAVING A POWDER OR POWDER BLEND AT LEAST PARTIALLY MECHANICALLY ATTACHED

PRIORITY APPLICATION

This Application is a continuation of U.S. application Ser. No. 13/923,956 filed Jun. 21, 2013, which is a continuation of U.S. application Ser. No. 13/444,370 filed Apr. 11, 2012, which issued as U.S. Pat. No. 8,542,966 on Sep. 24, 2013 and which is a continuation of U.S. application Ser. No. 13/030,807 filed Feb. 18, 2011, which issued as U.S. Pat. No. 8,180,190 on May 15, 2012 and which is a continuation of U.S. application Ser. No. 12/221,118, filed Jul. 31, 2008, which issued as U.S. Pat. No. 7,916,989 on Mar. 29, 2011, and the benefit of priority under 35 U.S.C §120 is hereby claimed.

FIELD OF THE INVENTION

The present invention relates generally to optical fiber assemblies used for transmitting optical signals. More particularly, the present invention relates to optical fiber assemblies including a powder or a powder blend for blocking water.

TECHNICAL BACKGROUND

Communications networks are used to transport a variety of signals such as voice, video, data and the like. As communications applications required greater bandwidth, communication networks switched to cables having optical fibers since they are capable of transmitting an extremely large amount of bandwidth compared with a copper conductor. Moreover, a fiber optic cable is much smaller and lighter compared with a copper cable having the same bandwidth capacity.

In certain applications, fiber optic cables are exposed to moisture that over time may enter the fiber optic cable. To address this moisture issue, fiber optic cables intended for these applications include one or more components for blocking the migration of water along the fiber optic cable. By way of example, conventional fiber optic cables block water migration using a filling and/or a flooding material such as gel or grease within the fiber optic cable. Filling material refers to gel or grease that is inside a tube or cavity with the optical fibers, whereas flooding material refers to gel or grease within the cable that is outside of the cavity that houses the optical fibers. The gel or grease works by filling the spaces (i.e., the voids) so that the water does not have a path to follow within the fiber optic cable. Additionally, the gel or grease filling material has other advantages besides water blocking, such as cushioning and coupling of the optical fibers which assists in maintaining optical performance during mechanical or environmental events affecting the fiber optic cable. Simply stated, the gel or grease filling material is multi-functional.

However, gel or grease filling materials also have disadvantages. For instance, the gel or grease is messy and may drip from an end of the fiber optic cable. Another disadvantage is that the filling material must be cleaned from the optical fibers when being prepared for an optical connection, which adds time and complexity for the craft. Moreover, cleaning the gel or grease requires the craft to carry the cleaning materials into the field for removing the gel or grease. Thus, there has been a long-felt need for fiber optic cables that eliminate the gel or grease materials while still providing all of the benefits associated therewith.

Early fiber optic cable designs eliminated the flooding material by using dry water-blocking components such as tapes or yarn outside the buffer tubes for inhibiting the migration of water along the cable. Unlike the gel or grease, the dry water-blocking components are not messy and do not leave a residue that requires cleaning. These dry water-blocking components typically include super absorbent polymers (SAPs) that absorb water and swell as a result, thereby blocking the water path for inhibiting the migration of water along the fiber optic cable. Generally speaking, the water-swellable components used a yarn or tape as a carrier for the SAP. Since the water-swellable yarns and tapes were first used outside the cavity housing the optical fibers, the other functions besides water-blocking such as coupling and optical attenuation did not need to be addressed.

Eventually, fiber optic cables used water-swellable yarns, tapes, or super-absorbent polymers (SAPs) within the tubes that housed the optical fibers for replacing the gel or grease filling materials. Generally speaking, the water-swellable yarns or tapes had sufficient water-blocking capabilities, but did not provide all of the functions of the gel or grease filling materials such as cushioning and coupling. For instance, the water-swellable tape and yarns are bulky since they are relatively large compared with a typical optical fiber and/or can have a relatively rough surface. As a result, water-swellable yarns or tapes may cause problems if the optical fiber is pressed against the optical fibers. Likewise, the SAPs may cause problems if pressed against the optical fibers. Stated another way, optical fibers pressed against the conventional water-swellable yarn, tapes, and/or SAPs may experience microbending which can cause undesirable levels of optical attenuation and/or cause other issues. Moreover, the desired level of coupling for the optical fibers with the tube may be an issue if the fiber optic cable is not a stranded design since the stranding provides coupling.

By way of example, U.S. Pat. No. 4,909,592 discloses conventional water swellable components used within a buffer tube having optical fibers. But, including conventional water-swellable components within the buffer tube can still cause issues with fiber optic cable performance that requires limitations on use and/or other design alterations. For instance, fiber optic cables using conventional water-swellable yarns within the buffer tube required larger buffer tubes to minimize the interaction of conventional water swellable yarns and optical fibers and/or limiting the environment where the cable is used.

Other early fiber optic cable designs used tubes assemblies that were highly-filled with SAPs as a loose powder for blocking the migration of water within the fiber optic cable. However, using a loose SAP powder within the fiber optic cable created problems since the SAPs powders could accumulate/migrate at positions within the fiber optic cable since it was not attached to a carrier such as a yarn or tape (i.e., SAPs powders would accumulate at the low points when wound on a reel due to gravity and/or vibration), thereby causing inconsistent water blocking within the fiber optic cable. Also, the loose SAP powder was free to fall out of the end of the tube. FIGS. 1 and 2 respectively depict a cross-sectional view and a longitudinal cross-sectional view of a conventional dry fiber optic assembly 10 having a plurality of optical fibers 1 along with a loose water-swellable powder 3 as schematically represented disposed within a tube 5. As shown, conventional dry fiber optic assembly 10 uses a relatively large quantity of SAP powder 3 within tube 5 for blocking the migration of water therein. Other conventional fiber optic cable components used embedded SAP powder in the outer surface of a tube such as disclosed in U.S. Pat. No. 5,388,175. However, embedding the SAP in the outer surfaces greatly reduced the effectiveness of the same since water can not reached the particles that are embedded.

The present invention addresses the long-felt need for dry fiber optic assemblies that provide suitable optical and mechanical performance while being acceptable to the craft.

SUMMARY

The present invention is directed to a fiber optic cable, which includes one or more optical fibers, a jacket, strength members, and water-swellable powder. The jacket is formed from a polymer and has a cavity defined therein. The one or more optical fibers extend through the cavity. Further, the jacket is non-round in cross-section and the strength members are encapsulated in the jacket on opposite sides of the cavity. The water-swellable powder is at least partially mechanically attached to an inner surface of the cavity, where the mechanical attachment of the water-swellable powder allows a portion of particles of the water-swellable powder to protrude beyond the surface and not be completely embedded therein.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principals and operations of the invention.

DETAILED DESCRIPTION OF THE PREFERRED EMBODIMENTS

The embodiments disclosed have several advantages compared with conventional dry fiber optic assemblies that use water-swellable powder. One advantage is that fiber optic assemblies have at least a portion of the water-swellable powder or powder blend mechanically attached to a surface of the fiber optic assembly (i.e., the tube or cavity wall) over less than all of the surface area while still effectively blocking the migration of water. Moreover, the existence of water-swellable powder within the fiber optic assembly or cable is nearly transparent to the craft since it is mechanically attached and may use relatively low-levels. Additionally, no cleaning of the optical fibers is necessary before connectorization like with gel or grease and no components such as water-swellable tapes or yarns require removing or cutting. Another advantage of having at least some of the powder or powder blend mechanically attached to the inside surface of the tube, cavity or the like is that it does not migrate like a loose powder of conventional dry fiber optic assemblies. Additionally, the tubes or cavities of the fiber optic assemblies can have smaller dimensions than conventional dry cable assemblies that use tapes or yarns as the carrier. As used herein, fiber optic assemblies include tube assemblies that exclude strength members, tubes assemblies having strength members, fiber optic cables, and the like.

Figure 1:
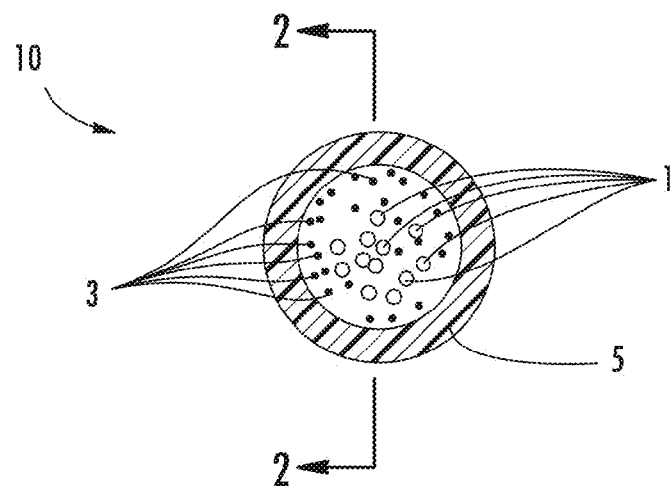
FIG. 1 is a cross-sectional view of the conventional fiber optic assembly using a relatively large quantity of water-swellable powder loosely disposed therein for blocking the migration of water within the same.
Figure 2:
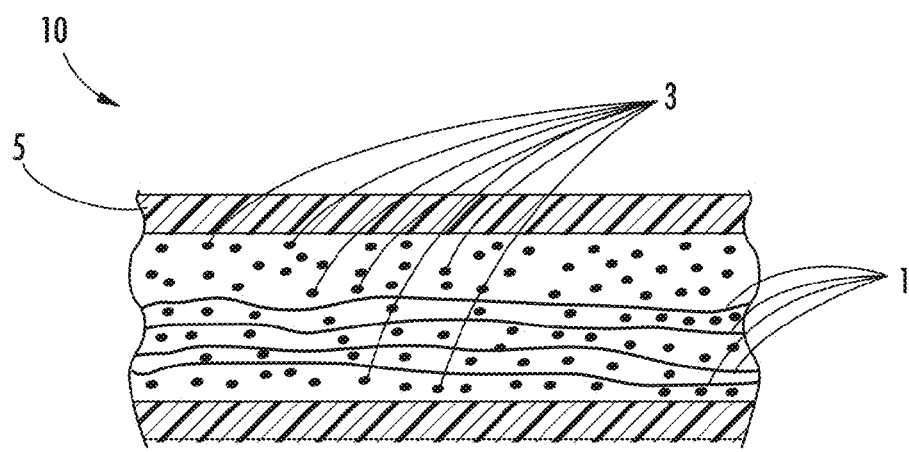
FIG. 2 is a longitudinal cross-sectional view of the conventional fiber optic assembly of FIG. 1.
Figures 3, 3A:
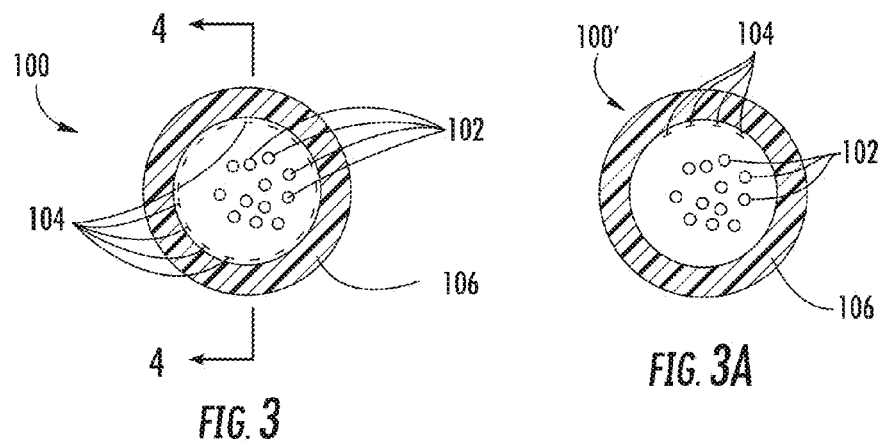
FIGS. 3 and 3A are cross-sectional views of fiber optic assemblies having a water-swellable powder for blocking the migration of water according to different embodiments.
Figure 4:
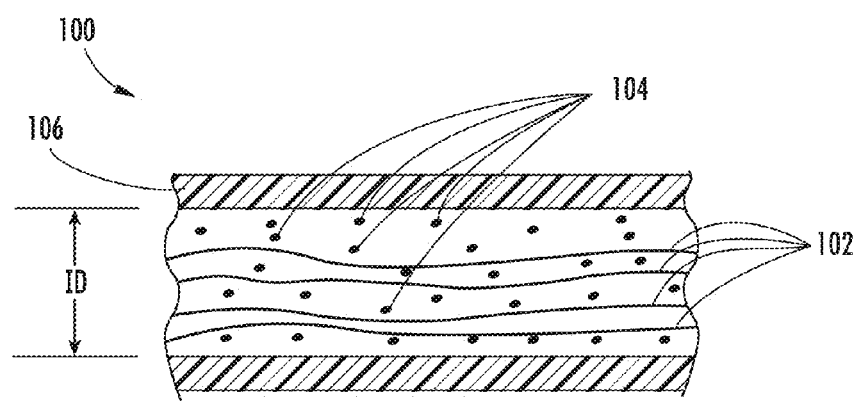
FIG. 4 is a greatly enlarged longitudinal cross-sectional view of the fiber optic assembly of FIG. 3.

Reference will now be made in detail to the present preferred embodiments of the invention, examples of which are illustrated in the accompanying drawings. Whenever possible, the same reference numerals will be used throughout the drawings to refer to the same or like parts. FIGS. 3 and 4 respectively schematically depict a cross-sectional and an enlarged longitudinal cross-sectional view of a fiber optic assembly 100 (i.e., a tube assembly) according to a first embodiment. Fiber optic assembly 100 includes a plurality of optical fibers 102, and a water-swellable powder or powder blend 104, and a tube 106. Optical fibers 102 may be any suitable type of optical waveguide as known or later developed. Moreover, the optical fibers may be a portion of a fiber optic ribbon, a bundle of optical fiber or the like. Optionally, optical fibers 102 are colored by an outer layer of ink (not visible) for identification and are loosely disposed within tube 106. In other words, optical fibers 102 are non-buffered, but the concepts of the present invention may be used with optical fibers having other configurations such as buffered, ribbonized, stranded, etc. In still further embodiments, the concepts disclosed herein may be used with hollow filler rods that do not include optical fibers therein. As shown, water-swellable powder 104 is, generally speaking, represented as disposed about the inner surface of tube 106 with a portion thereof mechanically attached as discussed herein. Further, water-swellable powder 104 is mechanically attached to a relatively small percentage of a surface area of the tube inner wall so that its use in the fiber optic assembly 100 is nearly transparent to the craft, but is surprisingly effective since it provides adequate water-blocking performance. Additionally, fiber optic assembly 100 need not include another component for blocking the migration of water within tube 106, but it may include other cable components.

Unlike conventional fiber optic tube assemblies, fiber optic tube assemblies have relatively high-levels of water-swellable powder 104 mechanically attached while still being able to block a one-meter pressure head of tap water within a one meter length for twenty-four hours. As used herein, tap water is defined as water having a saline level of 1% or less by weight. Similarly, fiber optic tube assemblies disclosed may also block saline solutions up to 3% by weight within 3 meters for 24 hours, and the blocking performance may even stop the 3% saline solution within about 1 meter for 24 hours depending on the design. Mechanical attachment of the powder preferably allows a portion of the water-swellable particle to protrude beyond the surface so that if water enters the cavity it may contact the particle. It is theorized that after the water contacts the water-swellable particle and initiates swelling that some of the particles break free of the surface so they can fully swell and/or move to form a water-blocking plug with other particles. In other words, if the particles of the powder remain attached to the surface or are embedded therein as in conventional designs they can not fully swell and will not be effective since they can not conglomerate with other particles. Thus, when mechanically attached the particles should have a portion thereof that protrudes beyond the surface and not be completely embedded therein. It should also be understood that not all of the water-swellable powder or powder blend is mechanically attached to the surface, but there may be some loose powder.

By way of example, water-swellable powder 104 is disposed within a tube having an inner wall with a given surface area per meter length. In one embodiment, about 30 percent or less of the surface area of the inner wall of the tube has water-swellable powder and/or powder blends mechanically attached thereto, but other percentages are possible such as 25 percent or less. Moreover, the mechanical attachment may be generally uniformly disposed on the surface area such as 30 percent or less of the entire surface as depicted. Conversely, mechanical attachment may be concentrated in longitudinal stripes or the like such as 100 percent or less mechanical attachment in one or more stripes that cover 30 percent or less of the surface area and 0% mechanical attachment at other locations as shown schematically in FIG. 3A. By way of example, if the tube has an inner diameter of about 2 millimeters (0.002 meters) the surface area per meter length is calculated as about 0.00628 square meters (pi×0.002 meter×1 meter) and water-swellable powder or powder blends are mechanically attached to about 0.002 square meters or less of the surface area of the inner wall (i.e., about one-third of the surface area per meter).

Figure 5:
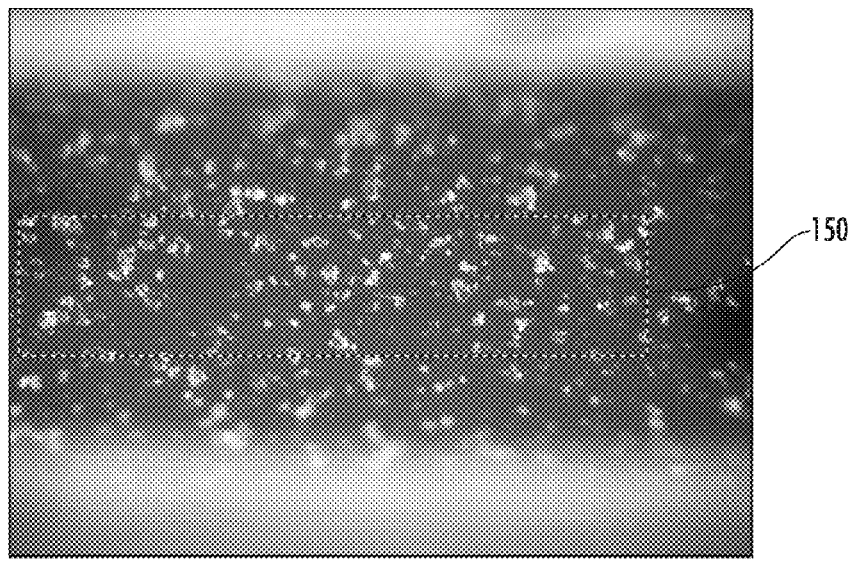
FIG. 5 is a photograph showing a magnified view of the inner wall of a tube having powder mechanically attached thereto with a region of interest depicted by a boxed area.

Measurement of the amount of surface area having a water-swellable powder or powder blend mechanically attached to a wall is measured by taking an average of several regions of interest (i.e., sample areas) such as five one square millimeter regions of interest spaced along the tube and magnifying the same using a microscope and determining an average of the five sample areas. Specifically, each one square millimeter sample area is magnified 50× and examined using an image analysis software package such as I-Solutions software available from Image and Microscope Technology of Vancouver, British Columbia Canada. FIG. 5 is a photograph showing a magnified view (about 50×) of the inner wall of a tube having powder mechanically attached thereto viewed using the I-Solutions software after any loose water-swellable powder or powder blend has been removed. Specifically, a sample length of about 100 millimeters long is cut and the optical fibers are removed from a first end of the tube. Thereafter, the second end of the sample is slit about 10-15 millimeters, thereby splitting a portion of sample in half Next, any loose powder is removed from the sample by tapping the second end (i.e., the split end) of the tube at least three times while holding the same in nearly vertical position so that any loose powder falls out of the sample. Finally, a portion of the split end is removed from the sample for viewing under magnification. FIG. 5 shows a region of interest 150 superimposed on a portion of the same that is depicted by a boxed area (i.e., the area within the dashed box is the region of interest).

Figure 5A:
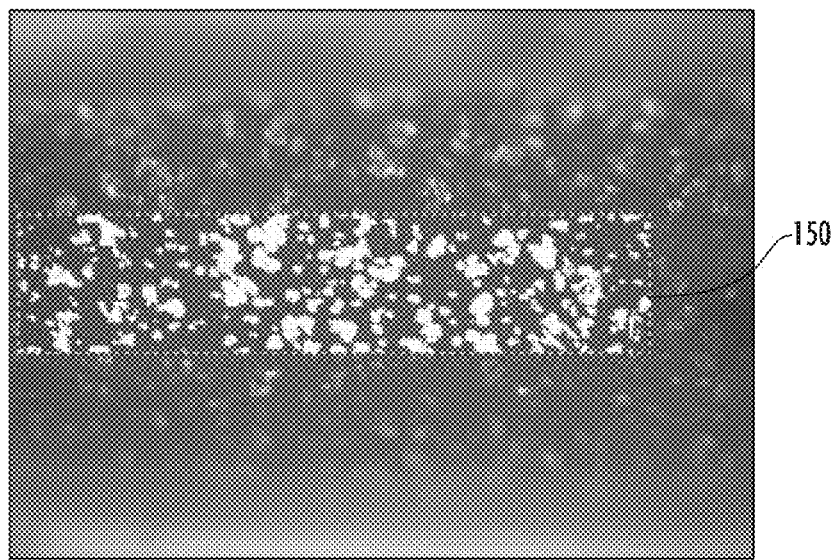
FIG. 5a is the photograph of FIG. 5 with the powder identified using a software package to determine the percentage of surface area of the region of interest that has the powder mechanically attached thereto.

FIG. 5a is the same photograph shown in FIG. 5 with the powder within the region of interest 150 identified using the software to determine the percentage of surface area within region of interest 150 that is mechanically attached thereto. In other words, the software allows the measurement of the percentage of surface area having powder mechanically attached thereto since the gray scale differentiation reveals the surface area having powder mechanically attached thereto relative to the tube wall. When using the software to determine the percentage of surface area having mechanical attachment, the threshold lighting should be properly adjusted to view the contrast between areas. Specifically, the incident angle of the lighting should provide suitable differentiation and oversaturation of light should be avoided so that the contrast between areas is easily visible. Region of interest 150 shown in FIG. 5a has the powder mechanically attached to about 30 percent or less of the region of interest 150 as depicted. In other embodiments, the powder can be mechanically attached to 25 percent or less of the surface area. Further, from the image the size and shape of the powder is observable.

Besides the surface area of the tube or cavity having a given percentage of mechanical attachment, the total percentage of water-swellable powder or powder blend that is mechanically attached to the fiber optic assembly can be quantified. Illustratively, the water-swellable powder or powder blend 104 has a relatively high level (i.e., 45 percent or more) of the same by weight mechanically attached to the inner tube wall and the remaining 55 percent of the powder or powder blend is loosely disposed within the tube. By way of example, if fiber optic assembly has 0.10 grams of powder per meter length, then about 0.045 grams or more of the powder is mechanically attached per meter length of the fiber optic assembly and 0.055 grams or less per meter is loose. Of course, the total percentage of the powder by weight mechanically attached can have other values such as 50 percent or more, 55 percent or more, 60 percent or more, 75 percent or more, 80 percent or more, 90 percent or more, or 95 percent or more, thereby respectively leaving 40 percent or more, 20 percent or more, 10 percent or more, or 5 percent or more of the powder loosely disposed within the tube or cavity. Table 1 below shows the above examples of total percentages of powder mechanically attached in tabular form for a concentration level of 0.10 grams of powder per meter length, but values for other concentration levels are also possible.

TABLE 1

Examples of Total Percentages of Powder Mechanically Attached

| Mechanically Attached/Loose (%) | Mechanically Attached Powder by Weight (grams) | Loose Powder by Weight (grams) |
| --- | --- | --- |
| 45/55 | 0.045 | 0.055 |
| 50/50 | 0.05 | 0.05 |
| 55/45 | 0.055 | 0.045 |
| 60/40 | 0.06 | 0.04 |
| 75/25 | 0.075 | 0.025 |
| 80/20 | 0.08 | 0.02 |
| 90/10 | 0.09 | 0.01 |
| 95/10 | 0.095 | 0.005 |

The total percentage of powder by weight mechanically attached can be determined by averaging the measured or calculated weight of the mechanically attached powder per meter length divided by the total weight of the powder per meter length disposed within the tube or cavity. Conversely, the total percentage of powder by weight loosely disposed can be determined by averaging the measured or calculated weight of the loosely disposed powder per meter length divided by the total weight of the powder disposed within the tube or cavity. However, measuring the percentage of powder or powder blend that is mechanically attached is easier and more precise. Additionally, if one of the percentages is known the other percentage may be calculated by subtracting.

In further embodiments, fiber optic assemblies can also have relatively small average concentrations of powder per meter, thereby making the powder in the fiber optic assembly nearly transparent to the craft. For instance, fiber optic assembly 100 may have about 0.02 grams of powder per meter length for a tube having a 2.0 millimeter inner diameter while still being suitable for blocking a one-meter pressure head of tap water within a one meter length for twenty-four hours, but other suitable concentration levels (i.e., weight per meter) both higher or lower are possible. Additionally, the average concentration levels are scalable based on cavity size.

By way of example, a cavity cross-sectional area for the 2.0 millimeter inner diameter tube is about 3.14 square millimeters, thereby yielding a normalized concentration value of about 0.01 grams of water-swellable powder per meter length of the tube assembly when rounded up. In other words, the normalized concentration per square millimeter of cavity cross-sectional area is given by taking the average concentration such as 0.02 grams per meter length of water-swellable powder divided by the cavity cross-sectional area of about 3 square millimeters to yield a normalized concentration value. In this example, normalized concentration value is about 0.01 grams of water-swellable powder per square millimeter of the cavity cross-sectional area per meter length of the tube when rounded upward. Consequently, the average concentration in grams per meter of water-swellable powder for cavities of tubes or fiber optic cables having a given cross-sectional area can be scaled (i.e., calculated) accordingly by using the normalized concentration value such as of 0.01 grams of water-swellable powder per meter length for each square millimeter of cavity cross-sectional area. Illustratively, if a cavity cross-sectional area is five square millimeters and a normalized concentration value of 0.01 grams per meter length is desired, then the fiber optic assembly has a 0.05 grams of powder in the cavity per meter length. In further embodiments, either higher or lower normalized concentration values are possible such as between 0.005 grams per meter length and 0.02 grams per meter length. Generally speaking, as the cross-sectional area of the cavity of the tube or the like increases, the amount of water-swellable powder needed for effectively blocking the migration of water along the same may increase generally proportionately for effective water-blocking.

The weight of the water-swellable powder per meter length (i.e., the concentration per meter length) in the fiber optic assembly is calculated by using the following procedure. A representative number of samples such as five one meter samples of the fiber optic tube assemblies are cut from the assembly being tested. The samples are preferably taken from different longitudinal portions along the fiber optic assembly rather than serially cutting samples from the same. Each one-meter sample is weighed with the optical fibers and water-swellable powder in the tube for determining a total weight of the sample using a suitably precise and accurate scale. Thereafter, the optical fibers (along with any other removable cable components within the tube, cavity, or the like) are pulled from the tube. The optical fibers (and any other cable components) are wiped with a fine tissue to remove any water-swellable powder thereon and then rinsed with water and wiped again with a damp towel, dried, and then wiped with alcohol and thoroughly dried. Thereafter, the optical fibers (and other cable components) are weighed to determine their weight without the water-swellable powder. Next, the tube is optionally weighed (without the optical fibers and other cable components) to determine its weight with the powder therein for verification of results. Then the tube is opened up along its longitudinal length using a suitable tool and tapped at least three times so that the loose power falls out of the same and then it is weight to determine the weight of the tube with the mechanically attached particles. Thereafter, the remaining water-swellable powder therein can be wiped from the tube rinsed with water and wiped again with a damp towel, dried, and then wiped with alcohol and thoroughly dried taking care to make sure that nearly all of powder or powder blend is substantially removed, then the "cleaned" tube is weighed to determine its weight without the water-swellable powder. Further, the optical fibers or portions of the tubes can be viewed under magnification to determine if the powder has been suitably removed before weighing. Thereafter, the sum of the weight of the optical fiber (and other cable components) along with the weight of the tube is subtracted from the total weight for the sample to determine the weight of the water-swellable powder in the respective sample. This procedure is repeated for each of the representative number of samples. The average concentration of water-swellable powder is calculated by adding all of the calculated weights of the water-swellable powders for the samples and dividing by the number of samples, thereby arriving at an average concentration of the water-swellable powder per meter for the fiber optic assembly.

Even though optical fibers may contact the powder or powder blend, fiber optic tube assemblies and/or cables such as fiber optic assembly 100 preserve the optical performance of optical fibers 102 therein. For instance, the optical fiber(s) of the fiber optic tube assemblies have a maximum optical attenuation of about 0.15 db/km or less at a reference wavelength of 1550 nanometers during standard temperature cycling under GR-20, which cycles temperatures down to −40° C. For instance, typical average optical attenuation values are about 0.05 db/km at a reference wavelength of 1550 nanometers during standard temperature cycling at −40° C. Furthermore, fiber optic tube assemblies have advantageously been temperature cycled at a reference wavelength of 1550 nanometers down to −60° C. using procedures similar to GR-20 while still having a delta attenuation of about 0.25 db/km or less without having to modify the design.

One factor that can affect optical performance is the maximum particle size, average particle and/or particle size distribution of water-swellable powder 104, which can impact microbending if the optical fibers should contact (i.e., press against) the water-swellable particles. Moreover, using water-swellable powders having relatively small particles improves the transparency of the same to the craft when the tube is opened. The average particle size for the water-swellable powder is preferably about 150 microns or less, but other suitable average particles sizes are possible such as 60 microns or less. The skilled artisan understands that since the powder is sieved using an appropriated sized mesh it has a distribution of particle sizes. For instance, individual particles may have an aspect ratio (i.e., longer than wide) that still fit through the sieving mesh in one direction and are larger than the average particle size. Using SAPs with a somewhat larger average maximum particle size may still provide acceptable performance, but using a larger maximum particle size increases the likelihood of experiencing increased levels of optical attenuation. Additionally, the shape of the particles may also affect the likelihood of experiencing increased optical attenuation. In other words, particles having round surfaces are less likely to experience elevated levels of optical attenuation compared with particles having rough surfaces. One explanatory water-swellable powder is a crosslinked sodium polyacrylate available from Evonik, Inc. of Greensboro, N.C. under the tradename Cabloc GR-211. The particle distribution for this explanatory water-swellable powder is given by Table 2.

TABLE 2

ParticleDistribution for an Explanatory Water-Swellable Powder

| Particle Size | Approximate Percentage |
|---|---|
| Greater than 63 microns | 0.2% |
| 45 microns-63 microns | 25.7% |
| 25 microns-44 microns | 28.2% |
| Less than 25 microns | 45.9% |

Of course, other powders, powder blends, and/or other particle distributions are possible. Another suitable crosslinked sodium polyacrylate is available from Absorbent Technologies, Inc. under the tradename Aquakeep J550P, still other types of water-swellable materials are also possible. By way of example, another suitable water-swellable powder is a copolymer of acrylate and polyacrylamide, which is effective with saline solutions. Furthermore, powder blends of two or more materials and/or water-swellable powders are possible such as blend of a slow-swelling water swellable powder and a fast-swelling water swellable powder. Likewise, a blend of water-swellable powder can include a first water-swellable powder that is highly-effective for a saline solution and a second water-swellable powder effective for tap water. Powder blends may also include components that are not inherently water-swellable. By way of example, small amounts of silica such as a fumed silica up to 3% may be added to a water-swellable powder for improving flow properties and/or inhibiting anti-caking due to moisture absorption. Additionally, concepts of the invention allow the use of other types of particles with or without the water-swellable particles such as flame-retardant particles (e.g., aluminum trihydrate, magnesium hydroxide, etc.), a dry lubricant like talc, graphite, boron, and/or the like.

A further factor to consider when selecting a water-swellable material is its absorption capacity. Absorption capacity is the amount of water that a unit of water-swellable material can absorb and is typically measured in grams of water absorbed per gram of water-swellable material. In one embodiment, the water-swellable material preferably has an absorption capacity of at least about 100 grams per grams of water-swellable material, but other values lower or higher are possible. For instance, the water-swellable material can have an absorption capacity of about 200 grams or more per gram of material, 300 grams or more per gram of material, or 400 grams or more per gram of material. Several factors may affect a material absorption capacity such as the type of material, the degree of cross-linking, the surface area, etc.

Another factor that may affect optical performance is excess fiber length (EFL) or excess ribbon length (ERL). As used herein, excess fiber length may refer to either EFL or ERL, but generally speaking ERL merely refers to excess ribbon length. Fiber optic assemblies of the present invention such as shown in FIG. 3 preferably have an excess fiber length that is preferably in the range of about −0.1% to about 0.3% to create acceptable contraction and tensile windows depending on the tube inner diameter, but other suitable values of excess fiber length or excess ribbon length are possible especially with other configurations/designs of fiber optic assemblies.

Furthermore, the powder or powder blends can inhibit the sticking between the optical fibers and the tube without using a separation layer or other material. Specifically, fiber optic assemblies can have issues with the optical fibers contacting and sticking to the tube while it is molten state when being extruded about the optical fibers. If the optical fiber sticks to the inside of the tube it can cause the path of the optical fibers to be distorted (i.e., the optical fiber is prevented from moving at that point), which may induce undesirable levels of optical attenuation. As depicted in FIGS. 3 and 4, tube 106 is disposed about optical fibers 102 of fiber optic assembly 100 without using a further material or component as a separation layer (e.g., no gel, grease, yarn, tape, etc.) for inhibiting contact between the optical fibers and the molten tube. Sticking is inhibited because the water-swellable powder is a cross-linked material so it does not promote sticking thereto at typical extrusion temperatures. Thus, water-swellable powder 104 tends to act as a separation layer since it inhibits optical fibers 102 from sticking to the molten tube during manufacture. However, other cable components may be included within the tube or cavity.

Moreover, the water-swellable powder 104 acts to reduce the friction between the optical fibers and the tube or cavity wall by acting as a slip layer. Simply stated, the particles of the water-swellable powder 104 act like ball-bearings between the optical fibers 102 and the inner wall of the tube for reducing the friction therebetween and allowing the optical fibers to move to a "relaxed state". In other variations, embodiments of the present invention may optionally use a lubricant in or on the outer layer of the optical fibers, thereby reducing the risk of optical fibers sticking to the extruded tube and/or reducing the friction therebetween. For instance, optical fibers 102 may include an outer layer such as an ink having a suitable lubricant for inhibiting optical fibers 102 from sticking to the molten tube 106 during extrusion of the same. Suitable lubricants include silicone oil, talc, silica or the like used in a suitable amount that it will inhibit "caking-up" and is disposed in or on the outer layer. Other methods are also available for inhibiting the sticking of optical fibers with the tube. For instance, tube 106 may include one or more suitable fillers in the polymer, thereby inhibiting the adherence of the optical fibers with the tube. Additionally, the use of other polymer materials for the tube such as a highly-filled PVC can inhibit sticking of the optical fibers to the tube. Furthermore, tube 106 may have a dual-layer construction with an inner layer of the tube having one or more suitable fillers in the polymer for inhibiting adhesion. Another way for inhibiting sticking of the optical fibers is to apply a lubricant to the inner wall of the tube or cavity shortly after forming the same.

Tube 106 may use any suitable polymer material for housing and protecting the optical fibers 102 therein. For instance, tube 106 can be a polypropylene (PP), polyethylene (PE), or blends of materials such as a blend of PE and ethylene vinyl acetate (EVA). In other embodiments, tube 106 is formed from a flame-retardant material such as flame-retardant polyethylene, flame-retardant polypropylene, polyvinyl chloride (PVC), or polyvinylidene fluoride PVDF, thereby forming a portion of a flame retardant fiber optic cable. However, tube 106 need not necessarily be formed from a flame-retardant material for making a flame-retardant fiber optic cable. In still other embodiments, tube 106 may comprise a thin sheath that is easily tearable by the craft without tools. For instance, tube 106 is formed from a highly filled material, thereby making it is easily tearable by the craftsman merely using their fingers to tear the same. By way of example, tubes that are easily tearable may include a filled materials such as polybutylene terephthalate (PBT), a polycarbonate and/or a polyethylene (PE) material and/or an ethylene vinyl acrylate (EVA) or other blends thereof having fillers like a chalk, talc, or the like; however, other suitable materials are possible such as a UV-curable acrylates. Generally speaking, all other things being equal tube 106 can have a smaller inner diameter ID compared with dry tube assemblies that include a water-swellable yarn, tape, or thread (i.e., a carrier for the SAP) with the optical fibers. This is because tube 106 does not have to provide the space for both the optical fibers and the carrier of the SAP (i.e., the yarn(s) or tapes); consequently the inner diameter ID may be smaller. For instance, having a smaller inner diameter ID for tube 106 is also advantageous since it allows for a smaller outer diameter, a more flexible assembly having a smaller bend radius (which may reduce kinking), is lighter in weight per length, and can fit longer lengths on a reel.

Illustratively, twelve standard sized 250 micron optical fibers arranged in a bundle having an overall diameter of about 1.2 millimeters can be housed in a tube or cavity with the inner diameter ID such as about 1.7 millimeters or less such as 1.6 millimeters or even as small as 1.5 millimeters or 1.4 millimeters with suitable performance down to −40° C. Other suitable inner diameters ID for the tube are possible and the ID can depend on the number of optical fibers within the tube or cavity. By way of comparison, a conventional fiber optic assembly with twelve optical fibers and a plurality of water-swellable yarns requires an inner diameter of about 2.0 millimeters to accommodate both the water-swellable yarns and the optical fibers.

Mechanical attachment of the water-swellable particles or powder blend 104 may be created by any suitable manufacturing process. One way of creating the mechanical attachment is to provide the particles of the powder with a suitable momentum so they impact a cone of a molten polymer that forms tube 106 as it is exiting the extruder. When the inner surface of tube 106 is still molten, at least some of the particles of powder are mechanically attached and/or transferred thereto when provided with a suitable momentum. Generally speaking, the suitable momentum can be effectuated by applying forces for imparting a velocity to the particles such as by air injection and/or by electrostatic charge. By way of example, powder having an average particle size of 60 microns or less can be directed to the molten tube with an exit velocity of about 20 meters/second for creating mechanical attachment thereto.

Figure 6:
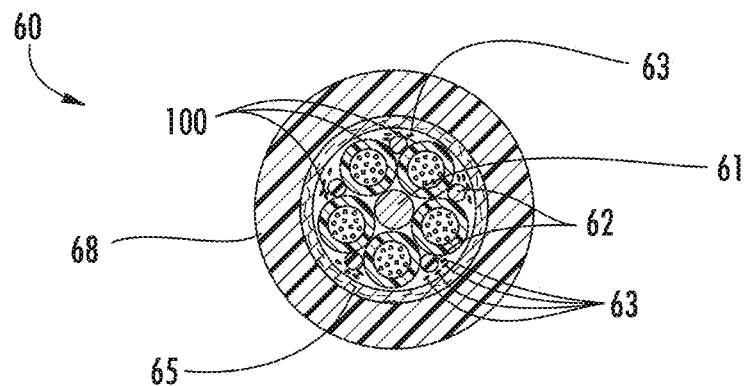
FIG. 6 is a cross-sectional view of a fiber optic cable using the fiber optic assembly of FIG. 3 in a stranded loose tube cable.

FIG. 6 is a cross-sectional view of a fiber optic cable 60 using several fiber optic assemblies 100 according to the present invention. As depicted, fiber optic assemblies 100 are stranded about a central member 61 along with a plurality of filler rods 62 and a plurality of tensile strength yarns 63, which have a water-swellable tape 65 disposed thereabout, thereby forming a fiber optic cable core (not numbered). Fiber optic cable 60 also includes a cable jacket disposed about the cable core for protecting the same. Any suitable strength elements are possible for tensile strength yarns 63 such as aramid yarns, fiberglass, or the like. Fiber optic cable 60 may also include other components such as one or more water-swellable yarns or a water-swellable tape disposed about central member 61. Additionally, fiber optic cable can eliminate elements such as the central member or other cable components if not necessary. Cable jacket 68 of fiber optic cables 60a and 60b may use any suitable material such as a polymer for providing environmental protection.

In one embodiment, cable jacket 68 is formed from a flame-retardant material, thereby making the fiber optic cable flame retardant. Likewise, tube 106 of fiber optic assembly 100 may also be formed from a flame-retardant material, but using a flame-retardant for the tube may not be necessary for making a flame-retardant cable. By way of example, a flame-retardant fiber optic cable may include cable jacket 68 formed from a polyvinylidene fluoride (PVDF) and tube 106 formed from a polyvinyl chloride (PVC). Of course, the use of other flame retardant materials is possible such as flame-retardant polyethylene or flame-retardant polypropylene.

Figure 7:
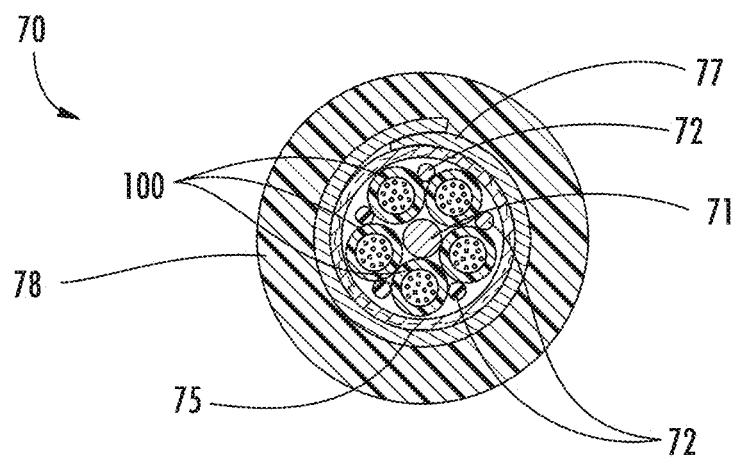
FIG. 7 is a cross-sectional view of another fiber optic cable according to another embodiment.

FIG. 7 is a cross-sectional view of a fiber optic cable 70 that is similar to fiber optic cable 60, but it further includes an armor layer 77. Like fiber optic cable 60, fiber optic cable 70 includes a plurality of fiber optic assemblies 100 stranded about a central member 71 along with a plurality of filler rods 72 and a water-swellable tape 75, thereby forming a cable core (not numbered). Armor layer 77 is disposed about water-swellable tape 75 and as shown formed from a metallic material, but other suitable materials may be used for the armor such as a polymer. Fiber optic cable 70 also includes a cable jacket 78 disposed about armor layer 77.

Figure 8:
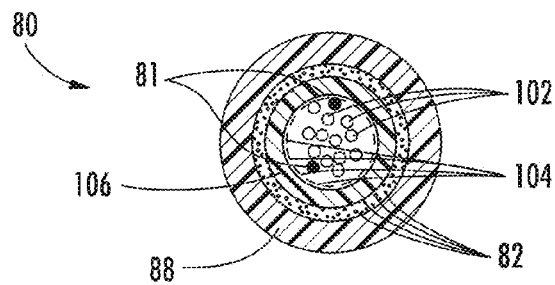
FIG. 8 is a cross-sectional view of another fiber optic cable according to the present invention.

FIG. 8 is a cross-sectional view of another fiber optic cable 80 configured as a monotube fiber optic cable design. More specifically, fiber optic cable 80 includes a single fiber optic assembly (not numbered) similar to fiber optic assembly 100 with optical fibers 102 and water-swellable powder 104 within tube 106, but it further includes a plurality of optional coupling elements 81 for providing a coupling force to optical fibers 102. Since this is a monotube design coupling is not provided by stranding of the fiber optic assemblies like fiber optic cables 60 and 70. Coupling elements 81 can be any suitable construction and/or material such as a string, thread, yarn, tape, elastomer element, or the like that can be wrapped about the optical fiber(s) or longitudinally disposed in the tube or cavity. Other variations for creating coupling include a surface roughness on the inner surface of the tube or cavity or extruding a material on the optical fibers such as an elastomer, fugitive glue or the like. As desired other embodiments may include any other suitable coupling element(s). Fiber optic cable 80 also includes a plurality of strength members 88 such as tensile yarns disposed radially outward of tube 106, but other types of strength members are possible such as GRPs. A cable jacket 88 is disposed about strength members 88 for providing environmental protection.

Figure 9:
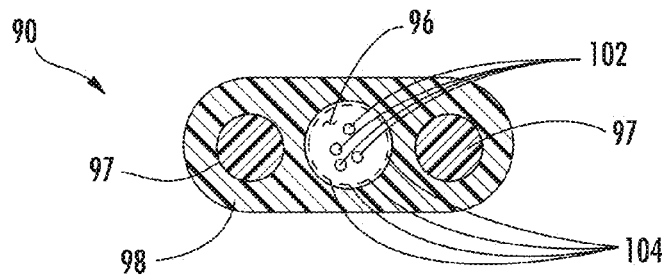
FIG. 9 is a cross-sectional view of another fiber optic cable according to the present invention.

Although, the previous embodiments depict the fiber optic assembly or fiber optic cable as being round it can have other shapes and/or include other components. For instance, FIG. 9 is a cross-sectional view of a fiber optic cable 90 according to the present invention. Fiber optic cable 90 includes optical fibers 102 and water-swellable powder 104 within a cavity 96 of cable jacket 98, which essentially is a tube for the fiber optic assembly. In this embodiment, cable jacket 98 is non-round and forms the cavity 96 for housing optical fibers 102 and water-swellable powder 104. Simply stated, fiber optic cable 90 is a tubeless configuration since optical fibers 102 can be accessed once cable jacket 98 is opened. In other words, the fiber optic cable does not include a buffer tube, but instead cable jacket 98 is the tube. Moreover, tube 98 (i.e., cable jacket) includes strength member 97 disposed therein (i.e., encapsulated within the cable jacket) and on opposite sides of cavity 96, thereby forming a strengthened tube or cable sheath. Of course, cavity 96 could have other shapes such as generally rectangular to generally conform to the shape of one or more fiber optic ribbons.

FIG. 9 and similar fiber optic cables that are tubeless, per se, can be manufactured by elastically straining the strength members while the cable jacket is being extruded thereover for creating and/or controlling the excess fiber length/excess ribbon length (EFL/ERL). Fiber optic cable 90 has a generally flat shape, but the concepts of elastically stretching the strength members are suitable with any suitable cross-sectional shape for the cable such as round. Specifically, strength members 97 are paying-off respective reels under a relatively high tension (e.g. between about 100 to about 400 pounds) using respective strength member capstans, thereby elastically stretching strength members 97 so that excess fiber length EFL (or ERL) is produced in fiber optic cable 90. In other words, after the tension is released on strength members 97 they return to their original unstressed length (i.e. shorten), thereby producing EFL since the optical fibers were introduced into the fiber optic cable with about the same length as tensioned strength members and the optical fibers were not stretched. Stated another way, the amount of EFL produced is equal to about the strength member strain (i.e., elastically stretching of the strength member) plus any plastic shrinkage of the cable jacket that may occur. The strength member strain can create a significant amount of EFL or ERL in a one-pass production such as 10% or more, 25% or more, 50% or more, and even up to 80% or more of the total EFL or ERL within the cable. Furthermore, elastically stretching of the strength member is advantageous since it allows for a precise control of the amount of EFL or ERL being introduced into the cable and greatly reduces strength member pistoning since the finished cable jacket is in compression instead of tension. For the manufacture of fiber optic cable 90, about 95% of EFL is introduced into the cable by elastically stretching the strength members. Simply stated, the cable jacket (i.e., the tube) is being applied about the optical fibers, water-swellable powder and strength members by a cross-head extruder while strength members 97 are elastically stretched. After extrusion, cable 90 is then quenched in water trough while the strength member is still elastically stretched, thereby allowing the cable jacket to "freeze" on the stretched strength members. The fiber optic cable 90 is then pulled through the manufacturing line using one or more caterpullers and then wound onto take-up reel under low tension (i.e., the tensile force that elastically stretched the strength members is released and strength members return to a relaxed length thereby creating ERL or EFL in the cable). Of course, this is merely an explanatory manufacturing line and other modifications are possible.

Figure 10:
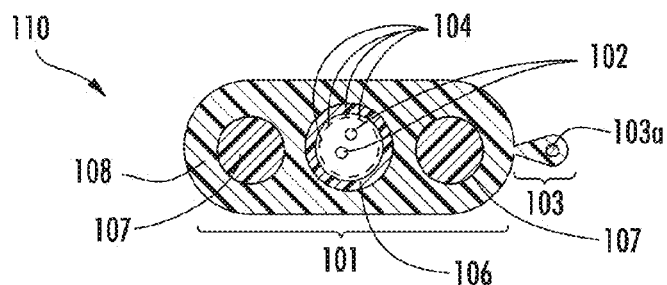
FIG. 10 is a cross-sectional view of another fiber optic cable according to the present invention.

FIG. 10 depicts a cross-sectional view of a fiber optic cable 110 having a main cable body 101 and a tonable lobe 103. Fiber optic cable 110 includes a fiber optic assembly 100 having optical fibers 102 and water-swellable powder 104 within tube 106. Fiber optic cable 110 may also include one or more water-swellable yarns (not visible) or a water-swellable tape disposed about tube 106 for blocking the migration of water along the fiber optic cable outside fiber optic assembly 100. Fiber optic cable 110 also includes a plurality of strength members 107 such as GRPs disposed on opposite sides of tube 106. Although strength members 107 are shown slightly spaced apart from tube 106 they may contact the same. Moreover, other materials are possible for strength members 107 such as steel wires or other suitable components. Fiber optic cable 110 also includes a cable jacket 108 formed from a suitable polymer, which forms a portion of main cable body 101 and tonable lobe 103 as shown. Tonable lobe 103 includes a toning wire 103*a* that is a suitable conductive element such as a copper wire or copper clad steel wire suitable for sending a signal for locating fiber optic cable 110 when buried. By way of example, toning wire 103*a* is a 24 AWG gauge copper wire. Additionally, toning lobe 103 has a frangible web (not numbered) for separating the same from the main cable body 101 when desired such as before connectorization. Of course, other variations are possible.

Figure 11:
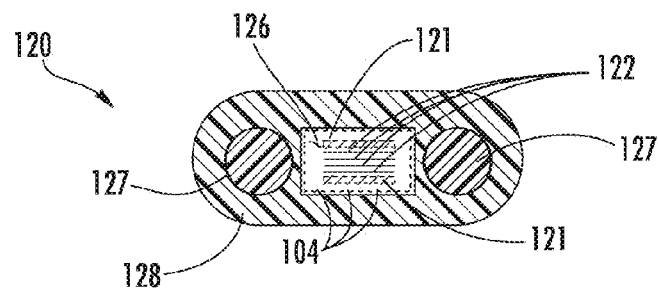
FIG. 11 is a cross-sectional view of another fiber optic cable according to the present invention.

FIG. 11 depicts a cross-sectional view of a fiber optic cable 120 that is a tubeless configuration (i.e., the cable jacket acts as the tube) having a plurality of fiber optic ribbons 122 therein as represented by the horizontal lines. Although fiber optic cable 120 is shown as a generally flat cable design it could have other suitable shapes such as variations of a flat cable or a round cable. As discussed above, the manufacture of fiber optic cable 120 is similar to the manufacture of fiber optic cable of FIG. 9. Fiber optic ribbons include a plurality of optical fibers (not visible) attached together using a suitable matrix material such as a UV curable matrix. Specifically, fiber optic cable 120 includes four fiber optic ribbons 122 each having twenty-four optical fibers for a total of ninety-six optical fibers, thereby forming a ribbon stack (not numbered). Similar fiber optic cables can have other fiber-counts within the ribbon and/or the fiber optic cable. As described above, fiber optic cable 120 includes water-swellable powder 104 that is at least partially mechanically attached on the inner surface of a cavity 126 of a cable jacket 128 and/or disposed on the fiber optic ribbon(s). For instance, powder or powder blend 104 has a normalized concentration of about 0.01 grams or less per meter for each square millimeter of cavity 126 of the fiber optic assembly, but other suitable concentrations may be used. By way of example, cavity 126 is sized to receive fiber optic ribbons (i.e., fiber optic components) and has a cavity width measured in millimeters and a cavity height measured in millimeters, which are multiplied together to calculate a cavity cross-sectional area in square millimeters. The stack of fiber optic ribbons also has a total cross-sectional area measured in square millimeters. The average concentration of water-swellable powder may be calculated using the cavity cross-sectional area or an effective cavity cross-sectional area. The effective cavity cross-sectional area is defined as the cavity cross-sectional area minus the cross-sectional area of the desired components therein such as the fiber optic ribbons within the cavity. Illustratively, an effective cross-sectional is calculated by subtracting the cross-sectional area of the fiber optic ribbons from the cavity cross-sectional area, which yields an effective cavity cross-sectional area in square millimeters. Thus, an average concentration for the amount of water-swellable powder in this design is calculated by taking the desired normalized concentration (grams per meter length of the assembly per square millimeter of the cavity) times the effective cavity cross-sectional area (square millimeters), which yields an average concentration for the water-swellable powder in grams per meter length of the assembly.

Additionally, fiber optic cable 120 may optionally include one or more coupling elements 121 as shown in phantom lines. When including one or more coupling elements 121 less of water-swellable powder 104 may be transferred to an inner surface of cavity 126 since the coupling elements 121 can inhibit the transfer (i.e., they are between a portion of the fiber optic ribbons and the cavity walls). More specifically, fiber optic cable 120 has two coupling elements (represented by the shaded rectangles) formed from a longitudinal foam tape, or other suitable coupling element disposed on opposite sides of the ribbon stack so that the coupling elements 121 sandwich the fiber optic ribbons 122 therebetween. Below is representative example to determine the average concentration of water-swellable powder using the effective cavity cross-sectional area for a larger cavity having fiber optic ribbons and coupling elements therein. In this instance, cavity 126 is sized to receive four twenty-four fiber optic ribbons (i.e., fiber optic components) and has a cavity width of about 8.2 millimeters and a cavity height of 5.2 millimeters, which are multiplied together to calculate a cavity cross-sectional area of about 43 square millimeters. The stack of fiber optic ribbons also have a total cross-sectional area of about 7.4 square millimeters and the sum of the coupling elements have a cross-sectional area of about 27.2 square millimeters. Thus, the effective cross-sectional for this example is calculated by subtracting the cross-sectional area of the fiber optic ribbons and coupling elements from the cavity cross-sectional area (i.e., 43 mm$^2$-7.4 mm$^2$-27.2 mm$^2$), which yields an effective cavity cross-sectional area of about 8 square millimeters. Thus, an average concentration for the amount of water-swellable powder for this design is calculated by taking the desired the normalized concentration times the effective cavity cross-section (i.e., 0.01 grams per meter length per square millimeter times 8 square millimeters), which yields an average concentration of about 0.08 grams per meter length for the cavity of the example that houses 96-optical fibers in a ribbon stack. Although, the average concentration of water-swellable powder is larger it still is a trace amount for water-blocking a larger effective cavity cross-sectional area, which is hardly noticeable by the craft and still effectively blocks the migration of water along the cavity of the fiber optic cable. Of course, other examples according to these concepts of the invention are possible.

Additionally, coupling elements 121 provide the optical fibers for this design with a coupling force of at least about 0.1625 Newtons per optical fiber for a thirty-meter length of fiber optic cable provided one or more coupling elements 121. Illustratively, a fiber optic cable having a single ribbon with twelve optical fibers in the ribbon should have a coupling force of about 1.95 Newtons or greater for a thirty-meter length of fiber optic cable. Likewise, a similar fiber optical cable having a single optical fiber ribbon with four optical fibers should have a coupling force of about 0.650 Newtons or greater for a thirty-meter length of fiber optic cable. Measurement of the coupling force is accomplished by taking a thirty-meter fiber optic cable sample and pulling on a first end of the optical fibers (or fiber optic ribbon(s)) and measuring the force required to cause movement of the second end of the optical fiber(s) (or fiber optic ribbon(s)). In other words, the excess fiber length (EFL), or excess ribbon length (ERL), must be straightened so that the coupling force is the amount of force required to move the entire length of optical fibers within the thirty-meter fiber optic cable sample. Besides providing coupling, coupling elements 121 can also cushion the ribbon stack, while still allowing movement of the fiber optic ribbons.

Fiber optic ribbons 122 of this design generally have more ERL than tube designs since the ribbon stack is not stranded. By way of example, fiber optic ribbons 122 have an ERL in the range of about 0.1% to about 1.2% or more and the amount of ERL can depend on the number of fiber optic ribbons within the stack and the strength members would be elastically stretched in a range similar to the desired ERL. Moreover, fiber optic cable 120 can use a manufacturing process similar to that described with respect to fiber optic cable 90 to elastically stretch one or more strength members 127, thereby creating the ERL. Specifically, a first strength member 127 and a second strength member 127 that are disposed on opposite sides of cavity 126 are elastically stretched by a predetermined amount during the extrusion of cable jacket 128. Furthermore, fiber optic cable 120 can be a portion of a distribution fiber optic assembly having one or more optical fibers split out for distribution. The optical fibers split out for distribution can be spliced with a tether, attached to a ferrule/connector, or merely be left splice ready for the craft.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

We claim:

1. A fiber optic cable, comprising:
one or more optical fibers,
a jacket formed from a polymer and having a cavity defined therein, wherein the one or more optical fibers extend through the cavity, wherein the jacket is non-round in cross-section;
strength members encapsulated in the jacket on opposite sides of the cavity;
water-swellable powder at least partially mechanically attached to an inner surface of the cavity, wherein the mechanical attachment of the water-swellable powder allows a portion of particles of the water-swellable powder to protrude beyond the surface and not be completely embedded therein.

2. The fiber optic cable of claim 1, wherein the non-round cross-section of the jacket is that of a generally flat cable.

3. The fiber optic cable of claim 1, wherein the fiber optic cable is tubeless in that the fiber optic cable does not include a buffer tube and the one or more optical fibers are accessible once the jacket is opened.

4. The fiber optic cable of claim 1, wherein the cavity is rectangular in cross-section.

5. The fiber optic cable of claim 4, wherein the one or more optical fibers are part of one or more fiber optic ribbons, the one or more fiber optic ribbons comprising a matrix attaching at least some of the one or more optical fibers together.

6. The fiber optic cable of claim 5, wherein water-swellable powder is disposed on the one or more fiber optic ribbons.

7. The fiber optic cable of claim 5, wherein the one or more fiber optic ribbons comprise a plurality of fiber optic ribbons, and wherein the fiber optic ribbons are stacked in a stack positioned in the rectangular cavity.

8. The fiber optic cable of claim 5, wherein the one or more fiber optic ribbons have an excess ribbon length of between 0.1% and 1.2%.

9. The fiber optic cable of claim 1, wherein the strength members comprise glass-reinforced plastic.

10. The fiber optic cable of claim 1, wherein the average particle size for the water-swellable powder is about 150 microns or less.

11. The fiber optic cable of claim 1, wherein the water-swellable powder has an absorption capacity of at least about 100 grams per grams of water-swellable powder.

12. The fiber optic cable of claim 1, wherein the mechanical attachment of the water-swellable powder is uniformly disposed on the surface of the cavity.

13. The fiber optic cable of claim 1, wherein the mechanical attachment of the water-swellable powder covers 30 percent or less of the entire surface of the cavity.

14. The fiber optic cable of claim 1, wherein the polymer of the jacket comprises at least one of polypropylene, polyethylene, polyvinyl chloride, or polyvinylidene fluoride.

15. A fiber optic cable, comprising:
one or more optical fibers,
a jacket formed from a polymer, wherein the jacket is non-round in cross-section;
a tube surrounded by the jacket and having a cavity defined therein, wherein the one or more optical fibers extend through the cavity;
strength members encapsulated in the jacket on opposite sides of the tube;
water-swellable powder at least partially mechanically attached to an inner surface of the cavity, wherein the mechanical attachment of the water-swellable powder allows a portion of particles of the water-swellable powder to protrude beyond the surface and not be completely embedded therein.

16. The fiber optic cable of claim 15, wherein the cavity has an inner diameter of about 1.7 millimeters or less.

17. The fiber optic cable of claim 15, wherein the non-round cross-section of the jacket is that of a generally flat cable.

18. The fiber optic cable of claim 15, wherein the average particle size for the water-swellable powder is about 150 microns or less.

19. The fiber optic cable of claim 15, wherein the water-swellable powder has an absorption capacity of at least about 100 grams per grams of water-swellable powder.

20. The fiber optic cable of claim 15, wherein the strength members comprise glass-reinforced plastic and contact the tube.

* * * * *